(12) United States Patent
George et al.

(10) Patent No.: US 8,589,862 B2
(45) Date of Patent: Nov. 19, 2013

(54) APPLICATION LOADING

(75) Inventors: Sam J. George, Kenmore, WA (US);
Akhilesh Kaza, Sammamish, WA (US);
Thomas D. Taylor, Seattle, WA (US);
Michael R. Harsh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1053 days.

(21) Appl. No.: 12/131,139

(22) Filed: Jun. 2, 2008

(65) Prior Publication Data
US 2009/0300597 A1 Dec. 3, 2009

(51) Int. Cl.
*G06F 9/44* (2006.01)
*G06F 9/445* (2006.01)

(52) U.S. Cl.
USPC .................................. 717/104; 717/173

(58) Field of Classification Search
USPC ................................... 717/120–178
See application file for complete search history.

(56) References Cited

U.S. PATENT DOCUMENTS

| | | | | |
|---|---|---|---|---|
| 5,983,229 A * | 11/1999 | Houchin et al. | | 370/474 |
| 6,347,398 B1 | 2/2002 | Parthasarathy et al. | | |
| 6,677,964 B1 * | 1/2004 | Nason et al. | | 715/764 |
| 6,802,061 B1 * | 10/2004 | Parthasarathy et al. | | 717/173 |
| 6,832,373 B2 | 12/2004 | O'Neill | | |
| 6,871,345 B1 * | 3/2005 | Crow et al. | | 717/175 |
| 7,000,230 B1 | 2/2006 | Murray et al. | | |
| 7,461,369 B2 * | 12/2008 | Zhao et al. | | 717/131 |
| 7,730,480 B2 * | 6/2010 | Isaacson | | 717/174 |
| 7,836,439 B2 | 11/2010 | Shenfield | | |
| 7,861,167 B2 | 12/2010 | Fernando et al. | | |
| 7,945,897 B1 * | 5/2011 | Cook | | 717/121 |
| 7,984,115 B2 | 7/2011 | Tien et al. | | |
| 7,987,449 B1 * | 7/2011 | Marolia et al. | | 717/120 |
| 8,091,087 B2 * | 1/2012 | Ali et al. | | 718/102 |
| 2002/0184619 A1 * | 12/2002 | Meyerson | | 717/173 |
| 2003/0145124 A1 * | 7/2003 | Guyan et al. | | 709/318 |
| 2004/0220893 A1 * | 11/2004 | Spivack et al. | | 706/46 |
| 2005/0091635 A1 * | 4/2005 | McCollum et al. | | 717/101 |
| 2006/0041662 A1 * | 2/2006 | Georgiev et al. | | 709/226 |
| 2007/0005734 A1 | 1/2007 | Abdo | | |
| 2008/0263511 A1 * | 10/2008 | Shapiro | | 717/104 |
| 2008/0301638 A1 * | 12/2008 | Apte et al. | | 717/120 |
| 2009/0193444 A1 * | 7/2009 | Clark et al. | | 719/331 |
| 2009/0260022 A1 * | 10/2009 | Louch et al. | | 719/328 |
| 2009/0320002 A1 * | 12/2009 | Peri-Glass et al. | | 717/131 |

OTHER PUBLICATIONS

"Silverlight Extensions", Mike Harsh, Sam George, Akhil Kaza, Tom Taylor and Stefan Wick, Jan. 3, 2013, retrieved this document from Microsoft Sharepoint Database, 9 pgs.

* cited by examiner

*Primary Examiner* — Don Wong
*Assistant Examiner* — Mohammad Kabir
(74) *Attorney, Agent, or Firm* — Microsoft Corporation (57) ABSTRACT

Extensions or additional software programs that are requested by a computer application running on an application platform are handled in an efficient manner by, among other things, regulating and tracking extensions that are downloaded. This allows the size of the application platform upon which the application is running to remain relatively small so as to mitigate strain on resources when the platform is initially deployed over a network (e.g., the Internet), thus making it easier and more likely for a user to install the application platform (and/or updates thereto). Requested extensions are subsequently added to and/or removed from the (already deployed) application platform based on, among other things, download metrics.

20 Claims, 9 Drawing Sheets

APPLICATION LOADING

BACKGROUND

Many computer software products or applications run on or are supported by an application platform. Such applications may also require additional supporting programs or extensions to provide additional functionality that affords users a more robust experience when interacting with the applications. For example, an Internet gaming application may be supported by or run on (some part of) a browser application platform, but may also require additional software packages or extensions to be downloaded to provide a user with a higher resolution visual and/or audio experience, for example, when interacting with the game.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Extensions or additional software programs that are requested by a computer application are handled in an efficient manner by, among other things, regulating and tracking extensions that are downloaded. This allows the size of an application platform upon which the application runs to remain relatively small so as to mitigate strain on resources when the platform is deployed over a network (e.g., the Internet). That is, while it might be convenient to include many of the extensions that may be requested by different applications in the initial version of the supporting application platform that is deployed, this could potentially make the application platform relatively large, and tax resources (e.g., bandwidth) upon deployment (making it potentially less likely that end users will download the application platform (and/or updates thereto)).

As provided herein efficient management of extensions is promoted by determining whether requested extensions are allowed to be downloaded, and not downloading those extensions that are not allowed (e.g., are not trusted, are outdated, are depreciated, etc.). Requested extensions that are allowed to be downloaded are downloaded and associated with the already deployed application platform. In one example, download metrics are tracked and some extensions (e.g., that are downloaded frequently) may be integrated into the application platform as part of a core application extensions set. Other extensions (e.g., that may be used less frequently and/or have an uncertain future) may merely remain in an allowed extensions list in the application platform such that they can be dynamically download by the application platform when referenced by an application. Additionally, an allowed extensions list can be updated by removing extensions that become stale or otherwise no longer desirable, for example.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Application platforms (e.g. internet browser plug-in, virtual machine, operating system, etc.) may be implemented to execute applications (e.g. web-based applications, script, applications running under an operating system, etc.). An end-user might download an application platform in order to load the application for use. One method of deploying an application platform to an end-user is by downloading and installing the application platform from an installation package. An end-user may be less likely to download the installation package, however, if the installation package requires more resources (e.g. time, bandwidth, etc.). Another consideration is the ability for the application platform to provide compatibility across different versions of applications as this may increase the size of the application platform. That is, extensions provide additional software or functionality to an application requesting the extensions, but the application platform's size increases as more extensions are incorporated therein to support the loading of both old and new versions of applications.

Additionally, application platform extensions may relate to technology that is outdated or depreciated (e.g. 5.25-inch disk support, etc.); emerging technology (e.g. support for high capacity storage devices); and/or basic core technology that is time test and is frequently required (e.g. buttons, text boxes, memory management, etc.), for example. An approach to mitigating the amount of extensions comprised within an application platform is to split out depreciated and emerging technology from the basic core technology. The application platform is deployed with a core application extensions set that provides basic technology that is core to many applications. Extensions relating to depreciated, emerging, or less frequently used technology are made available to the application platform through downloading.

The application platform provides security control by maintaining an allowed extensions list or logic. An example of allowed extensions logic is a whitelist of allowed extensions (or sources from which extensions may be obtained) and/or a blacklist of disallowed extensions (or sources from which extensions may not be obtained). A second example of allowed extensions logic is a certificate authenticating component that authenticates a certificate associated with a referenced extension. When an application is associated with at least one referenced extension, the application platform determines if the referenced extension is in the allowed extensions logic. The allowed extensions logic provides a means for using extensions that come from a trusted source. The application platform can silently manage extensions for a user through managing the allowed extensions logic by removing unsupported extensions and/or adding new extensions when emerging technology is supported, for example.

The application platform comprises a registered extensions set that maintains a set of available extensions. An example of when an extension could be registered is when the application platform downloads to a local file system a referenced extension that the application platform uses to load an application. If a referenced extension is within the registered extensions set, the referenced extension is already available to the application platform and it is unnecessary to download the referenced extension.

The application platform comprises a loader configured to determine if referenced extensions are allowed within the allowed extensions logic. If a referenced extension is allowed, then the loader determines if the referenced extension is specified within the registered extensions set. If the referenced extension is allowed and not registered, then the loader downloads and registers the referenced extension. The loader may download the referenced extensions from a predetermined source (e.g. file server, website, etc.). The referenced extension is available for the application platform the next time an application is associated with the referenced extension, therefore the loader will not have to again download the referenced extension. Once referenced extensions are registered, the loader loads the referenced extensions and the application into the application platform.

An application may reference optional extensions that are not required for the application to execute (within the application platform), but provide for enhanced functionality. An example is an application that displays photos. The application may reference extensions for displaying a photo, the ability to edit the photo, and the ability to save the photo. The application may also reference an optional extension for high resolution support. The referenced optional extension is not required for the application platform to load the application, but provides enhanced picture quality. The loader determines if the optional extension is allowed and/or registered. If the referenced optional extension is allowed and not registered, then the loader will download, register, and load the referenced optional extension.

An application platform can be serviced and maintained by a method of updating a core application extensions set and an allowed extensions logic. One method is for a tracking server to monitor the download of referenced extensions and generate a download metric. The download metric could be based on a percentage of applications that are associated with the referenced extensions among applications loaded within the application platform, for example. Another method would be for an application platform to notify a tracking server of referenced extensions associated with a loaded application, or to notify the tracking server of referenced extensions that require downloading. The tracking server can generate a download metric based on the number of times a referenced extension is downloaded, or generate a download metric based on any other appropriate technique, such as software quality metrics data, for example.

The tracking server can use download metric data to maintain the core application extensions set and the allowed extensions logic. An example is if a download metric indicates that an extension is not downloaded frequently, then the extension can be removed from the allowed extensions logic. This provides a method for discontinuing support to an extension that comprises technology that is depreciated or rarely used. A download metric may also indicate an extension is not frequently used from a core application extensions set and could be removed to mitigate the resources for deploying an installation package for the application platform.

If a download metric indicates an extension is downloaded frequently, then the extension can be added to a core application extensions set. The extension would then be removed from an allowed extensions logic because the extension is now available in the core applications set for the application platform and does not require downloading. This promotes efficiency since the extension that is frequently used is included in an application platform and thus does not have to be repeatedly downloaded.

An example of a method for updating an application platform is where a tracking server sends an allowed extensions logic and/or updated core application extensions set to the application platform. Another method is to incorporate the allowed extensions logic and/or updated core application extensions set with a subsequent deployment of the application platform.

Figure 1:
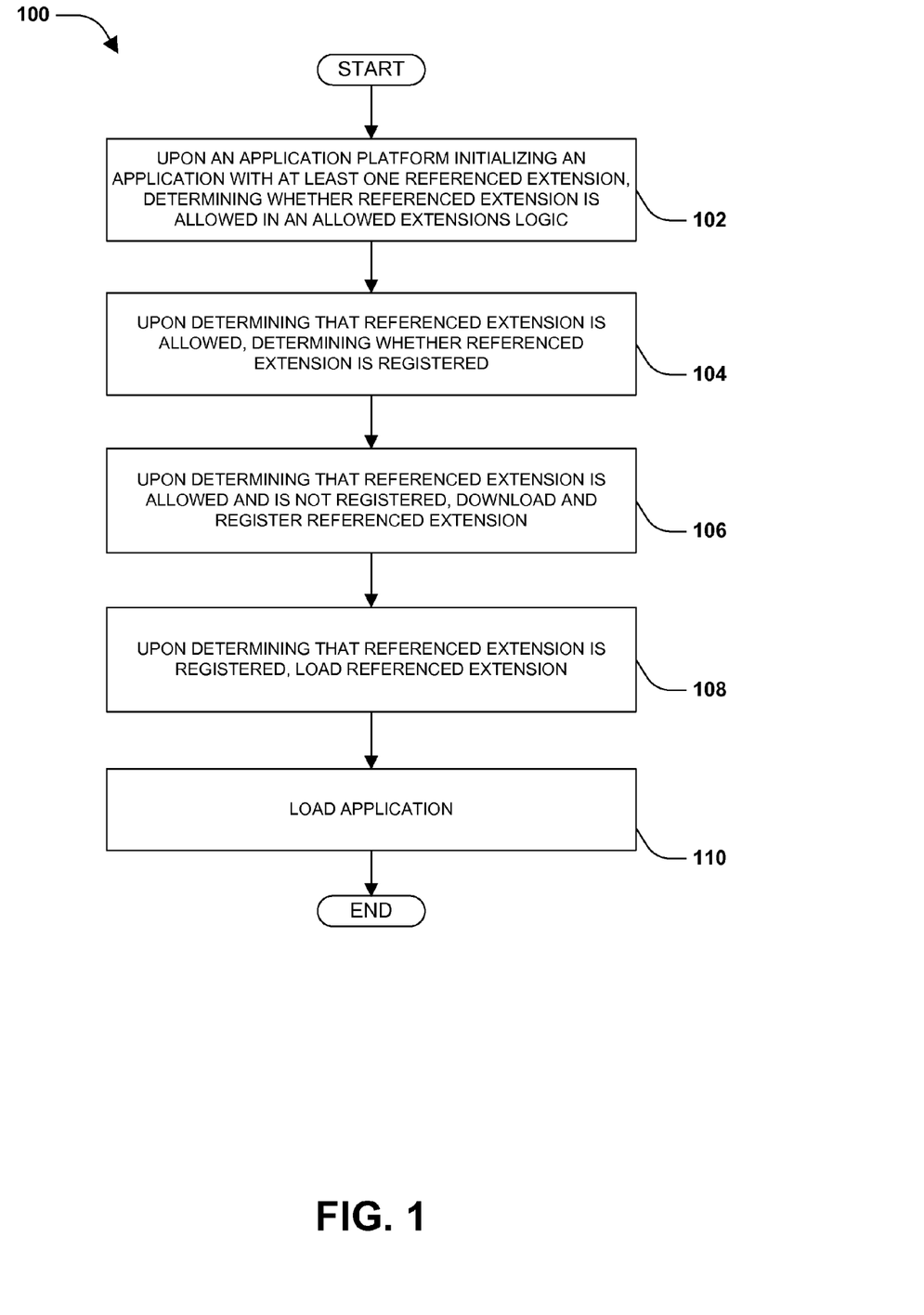
FIG. 1 is a flow diagram illustrating an exemplary method of loading an application which requires extensions into an application platform.

One embodiment of loading an application, which references one or more extensions, into an application platform is illustrated by an exemplary method 100 in FIG. 1. After initialization of an application associated with at least one referenced extension, a determination is made at 102 as to whether a referenced extension is permitted in an allowed extensions logic. The referenced extension may contain functionality (e.g. buttons, audio drivers, display drivers, etc.) required by the application for execution within the application platform. If a referenced extension is not within the allowed extensions logic, then the application platform fails to load the application.

At 104, upon determining that the referenced extension is allowed, a determination is made as to whether the reference extension is registered. If the referenced extension is within a registered extensions set, then the referenced extension is available to the application platform and the loader does not need to download the referenced extension. At 106, if the referenced extension is allowed (e.g., is part of an allowed extensions logic or list) and not registered, then referenced extension is downloaded and registered. An example of downloading and registering a referenced extension is a loader within an application platform downloads the referenced extension from a predetermined source and stores the referenced extension within a local file system. The loader also registers the referenced extension (e.g., by adding it to a registered extensions set). The next time an application references the referenced extension, the application platform can load the referenced extension from the local file system without the need to download the referenced extension again, thus conserving resources.

At 108, upon determining that the referenced extension is registered, the referenced extension is loaded. The application platform, at 110, loads the application if all referenced extensions are loaded. The application platform may fail to load the application if a referenced extension was not allowed within the allowed extensions logic or could not be downloaded. The application platform may provide notification of the failure (e.g., by sending a message to a server to debug a file).

Figure 2:
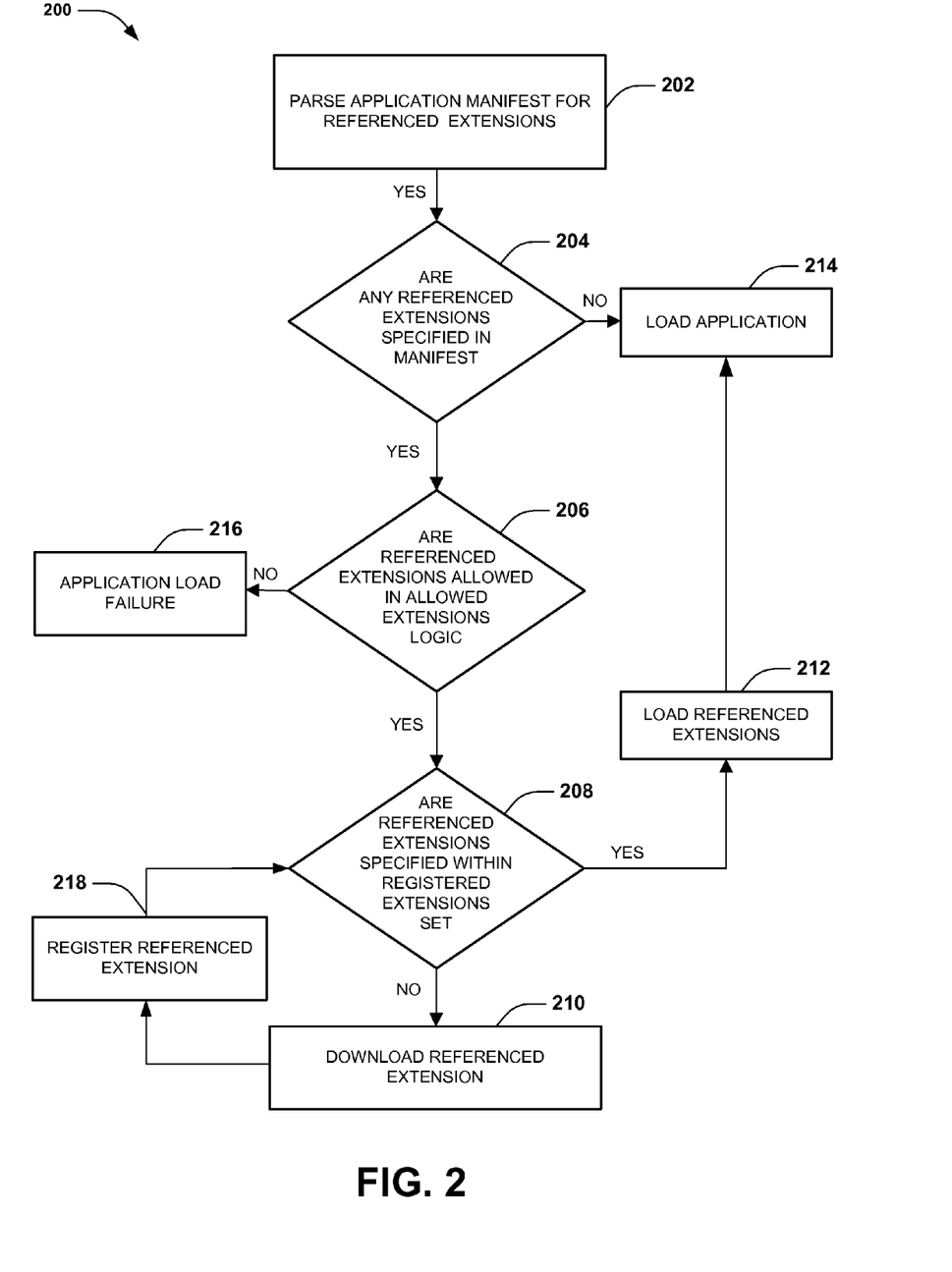
FIG. 2 is a flow diagram illustrating an exemplary method of loading an application which requires extensions into an application platform.

A second embodiment of loading an application into or through an application platform is illustrated by an exemplary method 200 in FIG. 2. At 202, a manifest of an application is parsed for referenced extensions. At 204, a determination is made as to whether any referenced extensions are in the manifest. If the application is not associated with at least one referenced extension, then the application platform loads the application at 214. At 206, if the application is associated with at least one referenced extension, then a determination is made to check if referenced extensions are allowed in an allowed extensions logic. If a referenced extension is not allowed, then the application platform fails to load the application, at 216

At 208, if referenced extensions are allowed, then a determination is made to check if a referenced extension is specified within a registered extensions list. Referenced extensions that are allowed and not registered are downloaded at 210 and registered at 218. At 212, if all referenced extensions are registered, then the referenced extensions are loaded. At 214, the application is then loaded into the application platform.

Figure 3:
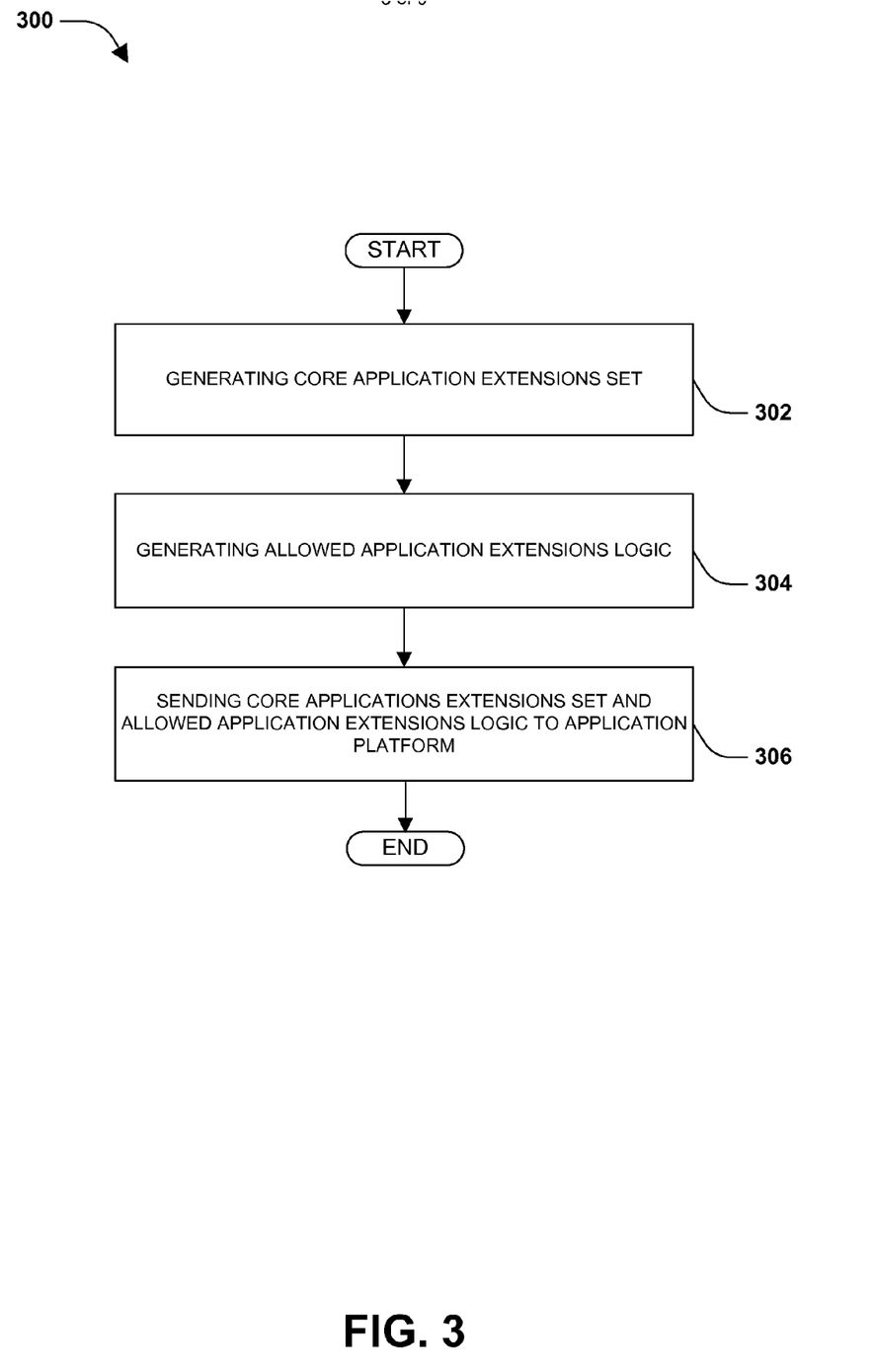
FIG. 3 is a flow diagram illustrating an exemplary method for controlling the loading of application extensions into an application platform.

One embodiment of controlling the loading of application extensions into an application platform is illustrated by an exemplary method 300 in FIG. 3. At 302, a core application extensions set is generated. The core application extensions set may comprise extensions, functionality, and/or integrated software that an application platform can provide without the need to download extensions. The core application extensions set may, for example, provide functionality or technology that is frequently used and/or that has stabilized over time (e.g., user interface buttons, memory management, etc.).

At 304, an allowed application extensions logic is generated. The allowed application extensions logic specifies what extensions an application is allowed to use when loading into an application platform. If an application is associated with at least one referenced extension that is not within the allowed application extensions logic, then the application platform will fail to load the application. With the core application extensions set and allowed application extensions logic generated, these items are sent to an application platform at 306 and the method ends thereafter.

Figure 4:
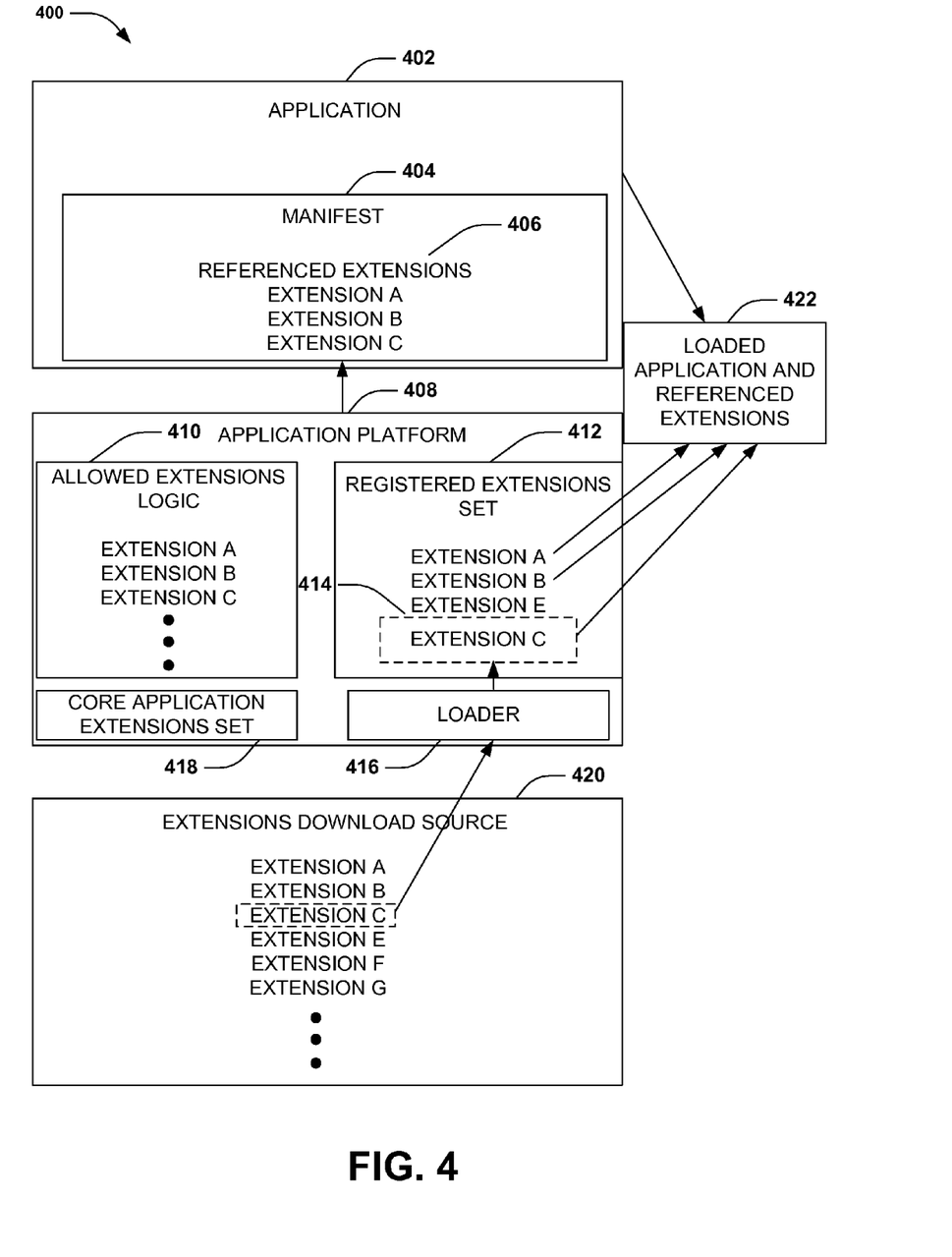
FIG. 4 is a component block diagram illustrating an exemplary system for loading an application where the application is associated with referenced extensions that are allowed, but one referenced extension is not registered and is thus downloaded.

FIG. 4 illustrates an example of a system 400 configured to load an application 402 into an application platform 408. The application 402 comprises a manifest 404 that specifies referenced extensions 406 that are associated with the application 402. The application platform 408 comprises an allowed extensions logic 410, a registered extensions set 412, and a core application extensions set 418. A loader 416 is configured to determine through the manifest 404 that the application 402 is associated with Extension A, Extension B, and Extension C. The loader 416 determines that Extension A, Extension B, and Extension C are allowed within the allowed extensions logic 410.

The loader 416 determines that Extension A and Extension B are specified within the registered extensions set 412, but that Extension C is allowed but not registered. The loader 416 thus causes Extension C to be downloaded from an extensions download source 420. The loader 416 then causes Extension C to be registered into the registered extensions set 412. Finally the loader 416 causes the application 402 and Extension A, Extension B, and Extension C, along with any functionality within the core application extensions set 418 the application 402 may need, to be loaded 422 into the application platform 408. Extension C is now available without the need for downloading it again because it is specified in the registered extensions set 412. When registering the downloaded referenced extension, the loader 416 may have downloaded Extension C to the local file system or through another method of making Extension C available to the application platform 408.

Figure 5:
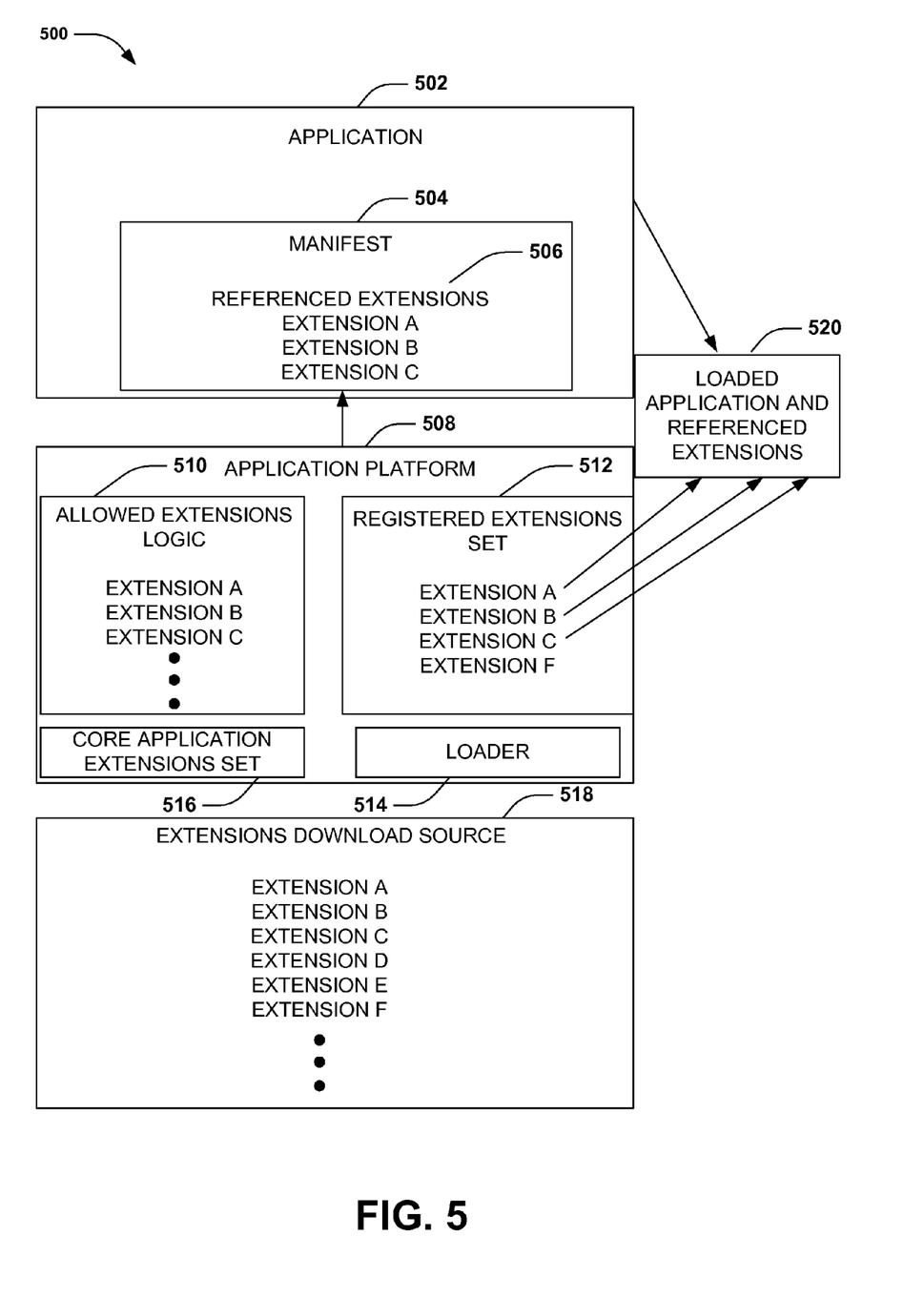
FIG. 5 is a component block diagram illustrating an exemplary system for loading an application where the application is associated with referenced extensions that are allowed and registered.

FIG. 5 illustrates an example of a system 500 configured to load an application 502 into an application platform 508. The application 502 comprises a manifest 504 that specifies referenced extensions 506 that are associated with the application 502. The application platform 508 comprises an allowed extensions logic 510, a registered extensions set 512, and a core application extensions set 516. A loader 514 is configured to determine through the manifest 504 that the application 502 is associated with Extension A, Extension B, and Extension C. The loader 514 determines that Extension A, Extension B, and Extension C are allowed within the allowed extensions logic 510.

The loader 514 determines that Extension A, Extension B, and Extension C are registered and are available without downloading (e.g. from an extensions download source 518). The loader 514 thus causes the application 502 and Extension A, Extension B, and Extension C, along with any functionality within the core application extensions set 516 the application 502 may need, to be loaded 520 into the application platform 508.

Figure 6:
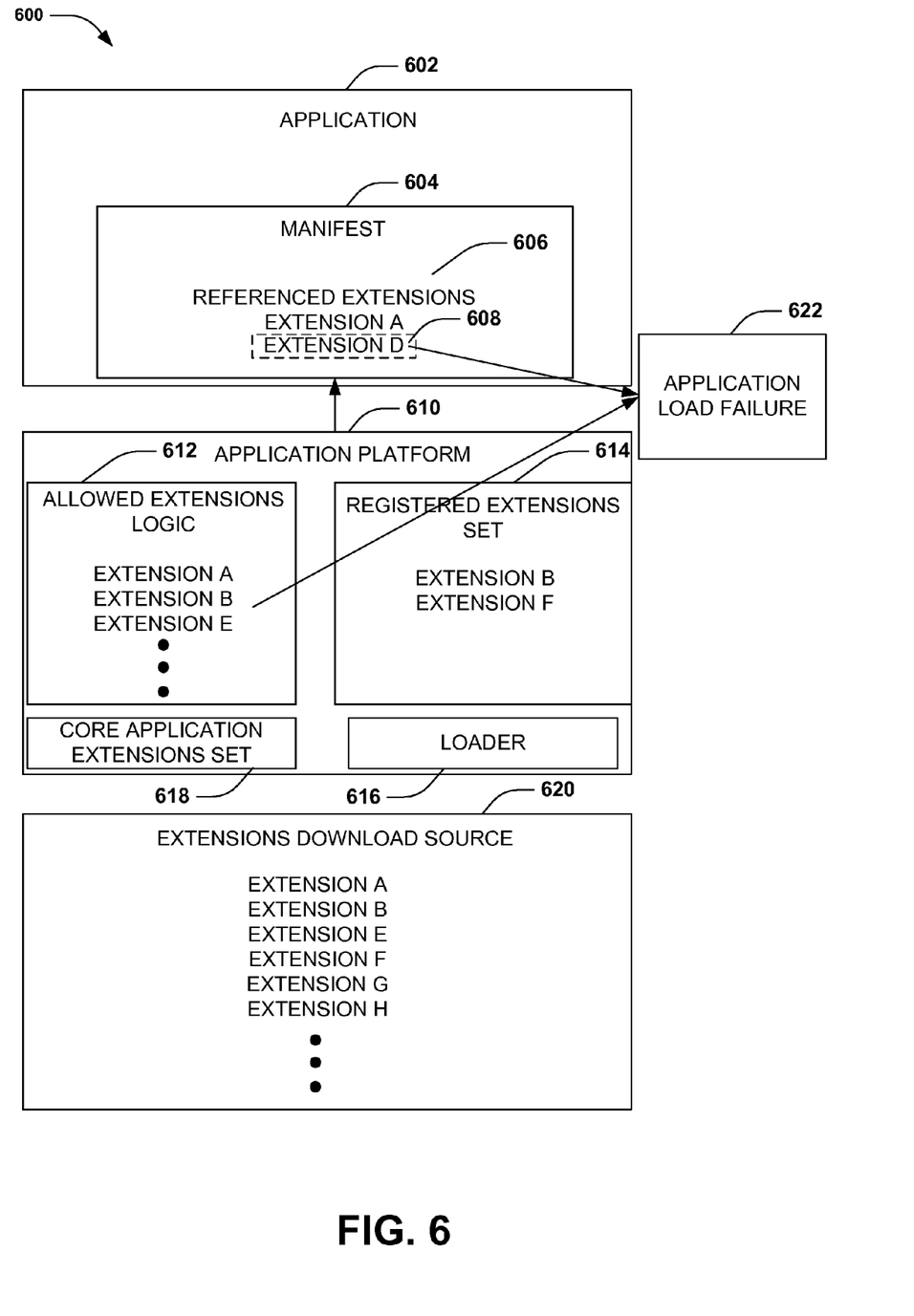
FIG. 6 is a component block diagram illustrating an exemplary system for loading an application where the application fails to load because the application specifies a referenced extension that is not allowed.

FIG. 6 illustrates an example of a system 600 configured to load an application 602 into an application platform 610. The application 602 comprises a manifest 604 that specifies referenced extensions 606 that are associated with the application 602. The application platform 610 comprises an allowed extensions logic 612, registered extensions set 614, and a core application extensions set 618. A loader 616 is configured to determine through the manifest 604 that the application 602 is associated with Extension A and Extension D 608. The loader 616 determines that Extension A is allowed within the allowed extensions logic 618, but Extension D 608 is not allowed within the allowed extensions logic 618. The loader 616 does not cause Extension D 608 to be downloaded (e.g. from an extensions download source 620). The loader 616 thus fails to cause the application 602 to load and may provide a notification 622 that the application 602 failed to load.

Figure 7:
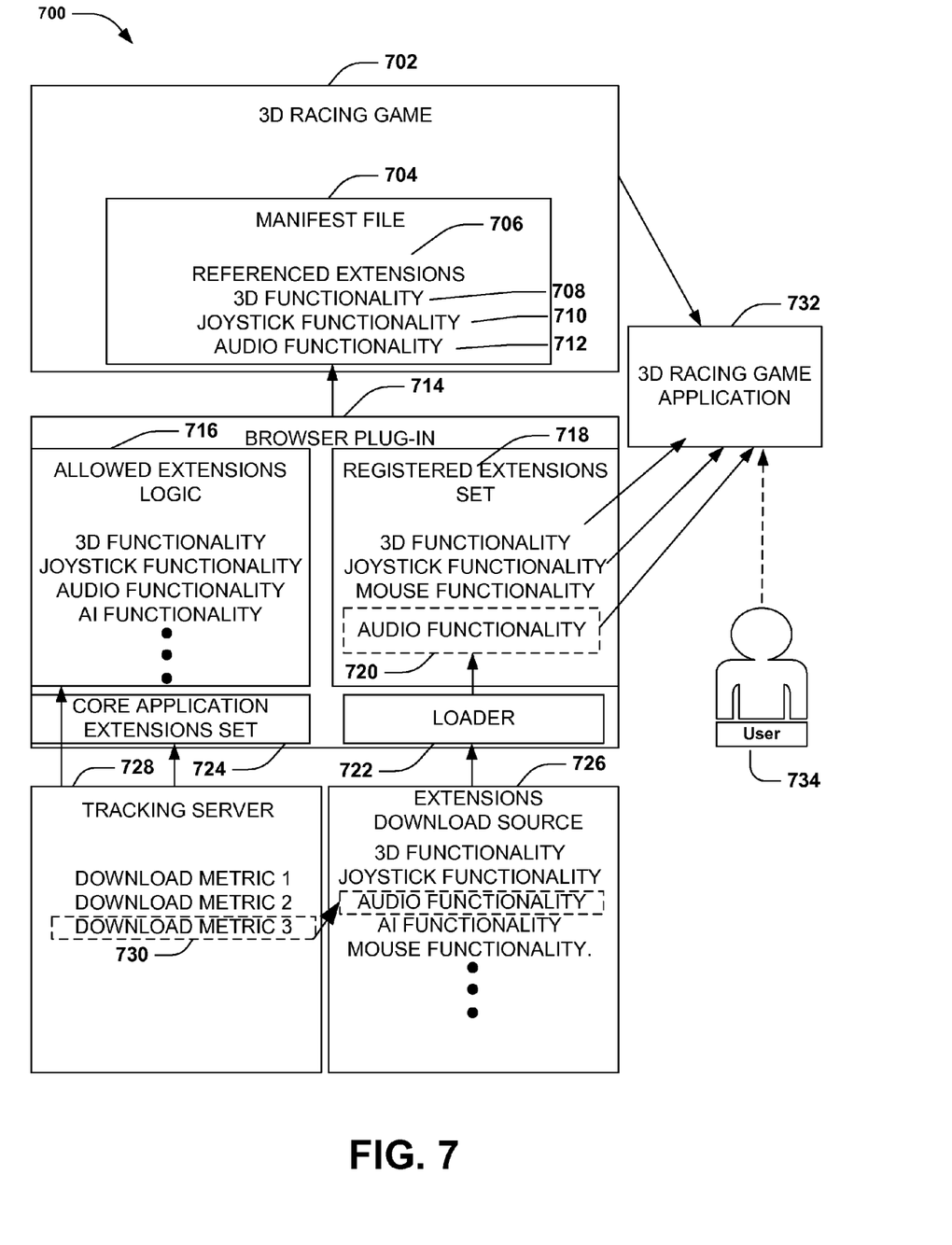
FIG. 7 is a component block diagram illustrating an exemplary system for loading a 3D racing game application where the 3D racing game is associated with referenced extensions that are allowed, but one referenced extensions is not registered and is thus downloaded.

FIG. 7 illustrates an example of a system 700 configured to load a 3D racing game 702 into a browser plug-in 714. The system 700 also illustrates an example of a tracking server 728 configured to control the loading of extensions within the browser plug-in 714. The 3D racing game 702 comprises a manifest file 704 that specifies referenced extensions 706 to provide additional functionality to the 3D racing game 702. The browser plug-in 714 comprises an allowed extensions logic 716, registered extensions set 718, and a core application extensions set 724. A loader 722 is configured to determine through the manifest file 704 that the 3D racing game 702 is associated with referenced extensions for 3D functionality 708, Joystick functionality 710, and an Audio functionality 712.

The loader 722 determines that the 3D functionality 708, Joystick functionality 710, and the Audio functionality 712 are allowed within the allowed extensions logic 716. The loader 722 determines that the 3D functionality 708 and Joystick functionality 710 are specified within the registered extensions set 718, and therefore they are available for the browser plug-in 714 without having to be downloaded. However, since the Audio functionality 712 is not within the registered extensions set 718, the loader 722 causes the Audio functionality 712 to be downloaded from an extensions download source 726 (because the extension for Audio functionality 712 is allowed, but is not registered). The loader 722 then causes the Audio functionality 720 to be registered within the registered extensions set 718.

The loader 722 thus causes the 3D racing game 702 and 3D functionality 708, Joystick functionality 710, and the Audio functionality 712, along with any functionality within the core application extensions set 718 the 3D racing game 702 may need, to be loaded 732 into the browser plug-in 714 for a user 734.

The browser plug-in 714, the extensions download source 726, or another source may send notification to a tracking server 728. The notification may contain information regarding what referenced extensions 706 the 3D racing game 702 required, information that Audio functionality 712 was downloaded, and/or any other type of notification. The tracking server 728 generates a download metric 3 730 that may contain information regarding the 3D racing game 702 referencing 3D functionality 708, Joystick functionality 710, and/or Audio functionality 712, for example. The tracking server 728 may also generate the download metric 3 730 based on the frequency that Audio functionality 720 is referenced by an application, downloaded, and/or any other appropriate metric.

The tracking server 728 is configured to determine if download metric 3 has risen above a predetermined high threshold or fallen below a predetermined low threshold. An example of a high threshold is 80% download frequency for a referenced extension. An example of a low threshold is 20% download frequency for a referenced extension. If download metric 3 730 has risen above a predetermined high threshold, then the tracking server 728 can cause the Audio functionality 712 to be added to the core application extensions set 724 and removed from the allowed extensions logic 716. The core application extensions set 724 and the allowed extensions logic 716 may be updated with the next deployment of the browser plug-in 714 through an installation package. This method provides the ability to integrate the Audio functionality 712 (or any other extension functionality) into future deployments of the browser plug-in 714 without the need for an application platform to download the Audio functionality 712 because it is already available within the core application extensions set 724.

If the download metric 3 730 has fallen below a predetermined low threshold, then the tracking server 728 may cause the Audio functionality 712 to be removed from the allowed extensions logic 716. The tracking server 728 may remove the Audio functionality 712 because it has become depreciated and is no longer used by applications, for example. The tracking server 728 may cause a referenced extension to be removed from the core application extensions set 724.

Figure 8:
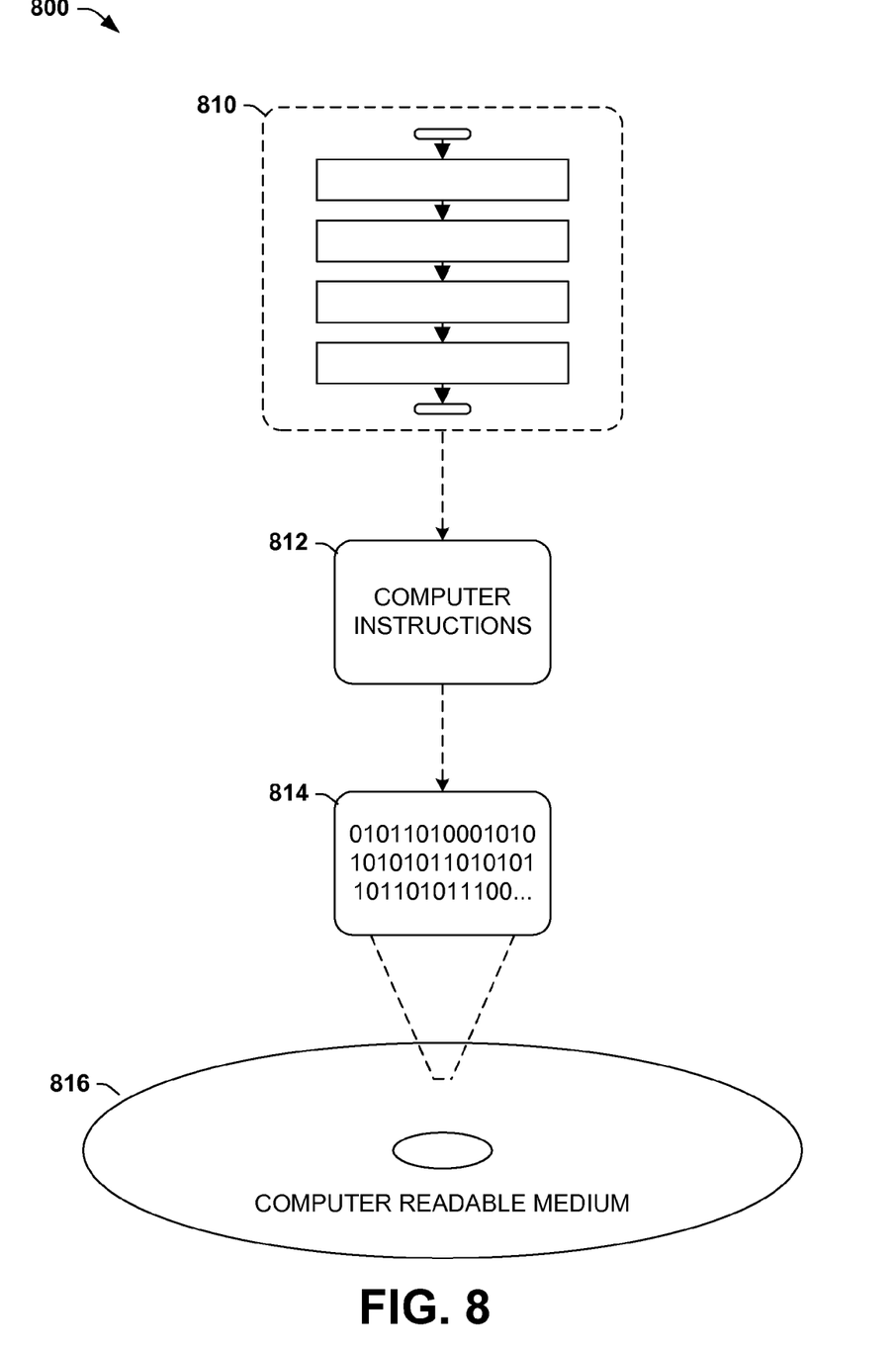
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 810. This computer-readable data 810 in turn comprises a set of computer instructions 812 configured to operate according to one or more of the principles set forth herein. In one such embodiment 800, the processor-executable instructions 814 may be configured to perform a method, such as the exemplary method 800 of FIG. 8, for example. In another such embodiment, the processor-executable instructions 814 may be configured to implement a system, such as the exemplary system 800 of FIG. 8, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
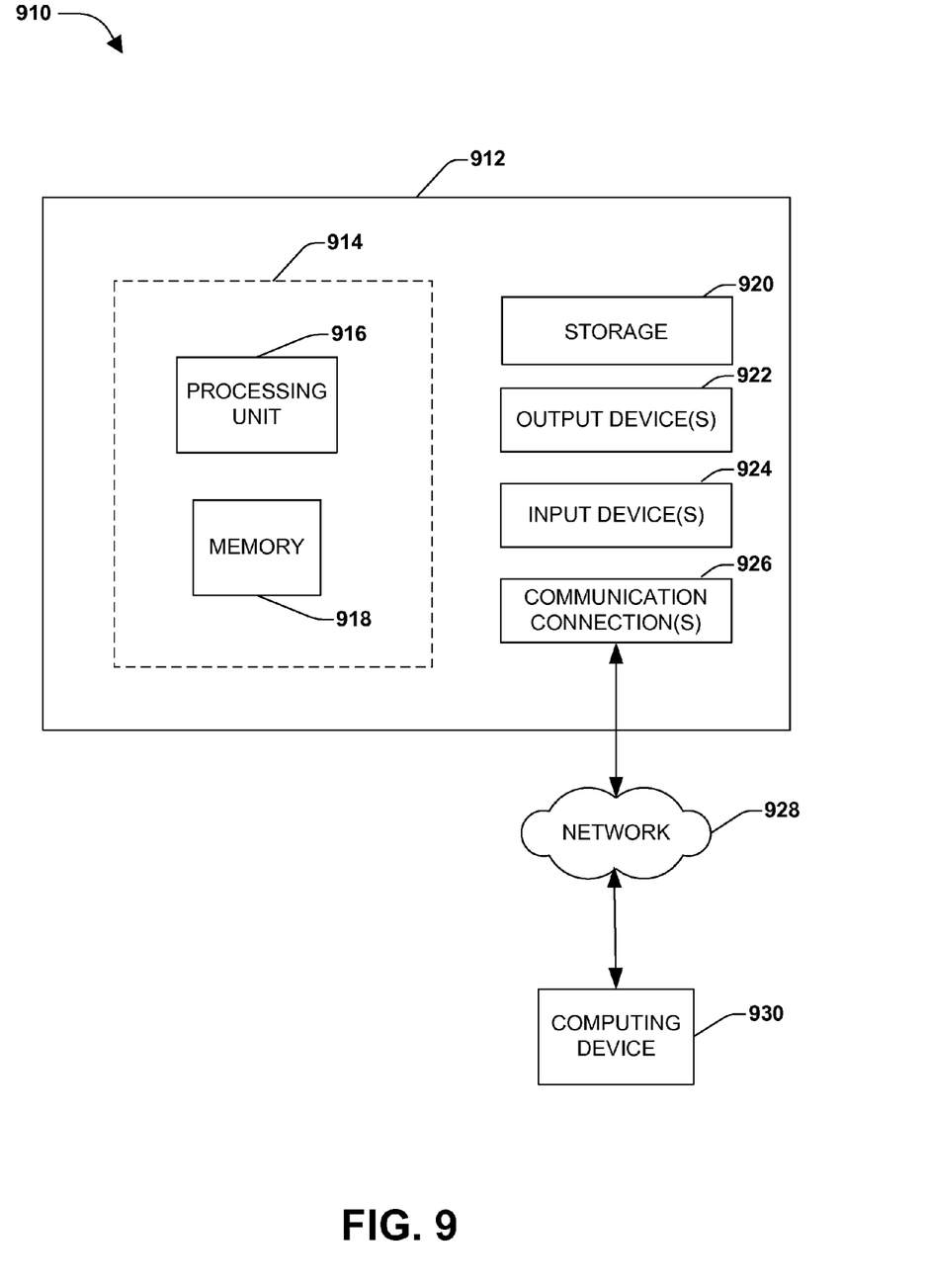
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for maintaining an application platform configured to execute an application, comprising:
   maintaining a set of core application extensions for an application platform that is configured to execute an application, the set of core application extensions comprising a core application extension available for loading by the application platform for execution of the application, the maintaining comprising:
      modifying the set of core application extensions based upon a download metric, the modifying comprising at least one of:
         removing the core application extension from the set of core application extensions based upon the download metric indicating that the core application extension is utilized below a low threshold; or
         adding an application extension as a new core application extension to the set of core application extensions based upon the download metric indicating that the application extension is utilized above a high threshold; and
   maintaining an allowed application extensions logic for the application platform, the allowed application extensions logic specifying one or more application extensions that are allowed for at least one of downloading or loading by the application platform for execution of the application, at least some of at least one of the maintaining a set of core application extensions, the modifying, the removing, the adding, or the maintaining an allowed application extensions logic implemented at least in part via a processing unit.

2. The method of claim 1, the application platform comprising a browser plug-in.

3. The method of claim 1, comprising:
   maintaining a registered extensions set for the application platform, the registered extensions set comprising one or more application extensions that are locally available for the application platform to utilize for execution of the application.

4. The method of claim 3, comprising:
   receiving a request to execute the application using a referenced application extension; and
   responsive to the referenced application extension being allowed within the allowed application extensions logic and not being registered within the registered extensions set:
      obtaining the referenced application extension from an extensions download source; and
      loading the referenced application extension for execution of the application through the application platform.

5. The method of claim 4, comprising at least one of:
   registering the referenced application extension with the registered extensions set; or
   updating a download metric for the referenced application extension based upon the obtaining of the referenced application extension from the extensions download source.

6. The method of claim 1, comprising:
   receiving a request to execute the application using a referenced application extension; and
   responsive to identifying the referenced application extension as the core application extension within the set of core application extensions, loading the core application extension for execution of the application through the application platform.

7. The method of claim 3, comprising:
   receiving a request to execute the application using a referenced application extension; and
   responsive to the referenced application extension being allowed within the allowed application extensions logic and being registered within the registered extensions set, loading the referenced application extension for execution of the application through the application platform.

8. The method of claim 7, comprising:
   updating a download metric for the referenced application extension based upon the loading of the referenced application extension.

9. The method of claim 1, comprising:
   receiving a request to execute the application using a referenced application extension; and
   responsive to the referenced application extension not being allowed within the allowed application extensions logic, failing to execute the application.

10. A system for maintaining an application platform configured to execute an application, comprising:
    one or more processing units; and
    memory comprising instructions that when executed via at least one of the one or more processing units implement at least some of:
    an application platform component configured to:
       maintain a set of core application extensions for an application platform that is configured to execute an application, the set of core application extensions comprising a core application extension available for loading by the application platform for execution of the application, comprising modifying the set of core application extensions based upon a download metric, the modifying comprising at least one of:
          removing the core application extension from the set of core application extensions based upon the download metric indicating that the core application extension is utilized below a low threshold; or
          adding an application extension as a new core application extension to the set of core application extensions based upon the download metric indicating that the application extension is utilized above a high threshold; and
       maintain a registered extensions set for the application platform, the registered extensions set comprising one or more application extensions that are locally available for the application platform to utilize for execution of the application.

11. The system of claim 10, the application platform component configured to:
    maintain an allowed application extensions logic for the application platform, the allowed application extensions logic specifying one or more application extensions that are allowed for at least one of downloading or loading by the application platform for execution of the application.

12. The system of claim 11, the application platform comprising a browser plug-in.

13. The system of claim 11, the application platform component configured to:
    receive a request to execute the application using a referenced application extension; and responsive to the referenced application extension being allowed within the allowed application extensions logic and not being registered within the registered extensions set:
    obtain the referenced application extension from an extensions download source; and
    load the referenced application extension for execution of the application through the application platform.

14. The system of claim 13, the application platform component configured to at least one of:
    register the referenced application extension with the registered extensions set; or
    update a download metric for the referenced application extension based upon the obtaining of the referenced application extension from the extensions download source.

15. The system of claim 11, the application platform component configured to:
    receive a request to execute the application using a referenced application extension; and
    responsive to the referenced application extension being allowed within the allowed application extensions logic and being registered within the registered extensions set, load the referenced application extension for execution of the application through the application platform.

16. The system of claim 15, the application platform component configured to:
    update a download metric for the referenced application extension based upon the loading of the referenced application extension.

17. The system of claim 10, the application platform component configured to:
    receive a request to execute the application using a referenced application extension; and
    responsive to identifying the referenced application extension as the core application extension within the set of core application extensions, load the core application extension for execution of the application through the application platform.

18. A computer-readable medium not comprising a modulated data signal and comprising processor-executable instructions that when executed perform a method for maintaining an application platform configured to execute an application, comprising:
    maintaining a set of core application extensions for an application platform that is configured to execute an application, the set of core application extensions comprising a core application extension available for loading by the application platform for execution of the application, the maintaining comprising:
        modifying the set of core application extensions based upon a download metric, the modifying comprising at least one of:
            removing the core application extension from the set of core application extensions based upon the download metric indicating that the core application extension is utilized below a low threshold; or
            adding an application extension as a new core application extension to the set of core application extensions based upon the download metric indicating that the application extension is utilized above a high threshold; and
    maintaining an allowed application extensions logic for the application platform, the allowed application extensions logic specifying one or more application extensions that are allowed for at least one of downloading or loading by the application platform for execution of the application.

19. The computer-readable medium of claim 18, comprising:
    maintaining a registered extensions set for the application platform, the registered extensions set comprising one or more application extensions that are locally available for the application platform to utilize for execution of the application.

20. The computer-readable medium of claim 19, comprising:
    receiving a request to execute the application using a referenced application extension; and
    responsive to the referenced application extension being allowed within the allowed application extensions logic and not being registered within the registered extensions set:
        obtaining the referenced application extension from an extensions download source; and
        loading the referenced application extension for execution of the application through the application platform.

\* \* \* \* \*